United States Patent
Shrader

(10) Patent No.: US 7,244,377 B2
(45) Date of Patent: Jul. 17, 2007

(54) ACOUSTIC ENHANCEMENT OF PARTICLE FABRICATION BY SPINNING

(75) Inventor: Eric J. Shrader, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 90 days.

(21) Appl. No.: 11/255,902

(22) Filed: Oct. 21, 2005

(65) Prior Publication Data

US 2007/0090551 A1   Apr. 26, 2007

(51) Int. Cl.
*B29B 9/10* (2006.01)
(52) U.S. Cl. .............................................. 264/8; 425/8
(58) Field of Classification Search .................... 264/8; 425/8
See application file for complete search history.

(56) References Cited

U.S. PATENT DOCUMENTS

| 4,126,854 | A |   | 11/1978 | Sheridon |
| 4,143,103 | A |   | 3/1979  | Sheridon |
| 5,262,098 | A |   | 11/1993 | Crowley et al. |
| 5,344,594 | A | * | 9/1994  | Sheridon ............... 264/4.1 |
| 5,976,428 | A | * | 11/1999 | Richley ................ 264/10 |
| 7,074,353 | B2 | * | 7/2006 | Jachuck et al. ........... 264/7 |
| 2006/0255487 | A1 | * | 11/2006 | Sibley et al. ............. 264/8 |

FOREIGN PATENT DOCUMENTS

WO        WO 00/48731        *  8/2000

* cited by examiner

Primary Examiner—Mary Lynn Theisen
(74) Attorney, Agent, or Firm—Fay Sharpe LLP

(57) ABSTRACT

A method and apparatus for the improved formation of beads or particles. The apparatus comprises a spinning disk including a vibration inducing material. Said vibration inducing material excites the liquid material as it proceeds towards the outer perimeter of said spinning disk, controlling the droplet break-off frequency.

23 Claims, 11 Drawing Sheets

ACOUSTIC ENHANCEMENT OF PARTICLE FABRICATION BY SPINNING

BACKGROUND

The present exemplary embodiment relates to an apparatus and method for the improved fabrication of small particles, which may also be described as beads or balls. The embodiment finds specialized application in the fabrication of bichromal particles, for a twisting ball display and more specifically to improved control of system parameters resulting in improved uniformity of the final product.

A common procedure for making small particles is known as bead spinning, which involves flowing a liquid onto a spinning disk. The liquid is carried to the outside perimeter of the disk by centrifugal force. Droplets of liquid fly off the edge of the disk and, by drying and/or cooling, solidify. The droplets are collected as solid particles or used to form a film on a surface.

Bichromal balls have hemispheres of contrasting colors and find particular use in "electric paper" displays. Electric paper displays are described in a number of patents including U.S. Pat. Nos. 4,126,854 and 4,143,103 assigned to the present assignee.

One method for making bichromal balls is described in U.S. Pat. No. 5,262,098, which is assigned to the present assignee and is herein fully incorporated by reference. This patent describes an additional step to the traditional bead spinning procedure described above. One liquid is flowed on the top side, of the spinning disk and another liquid is flowed on the bottom side of the same disk. As the disk spins, both liquids are drawn to the outside perimeter of the disk. As the liquids reach the edge of the disk, the liquid on the top of the disk and the liquid on the bottom of the disk merge into a droplet composed of a top side liquid hemisphere and a bottom side liquid hemisphere. The composite droplets then fly off the edge of the disk and solidify prior to landing. When the top side liquid is a contrasting color from the bottom side liquid, a bead with hemispheres of contrasting colors results.

Applications using these particles generally require the particles be very small. The patents cited above refer to bichromal balls in the range of 5 microns to 500 microns. Variations of size and shape of the final product particles may result in nonfunctionality. Due to the ease of nonconformity and the relatively small size of each particle, a wasteful and time-consuming sieving process must be undertaken to narrow the size distribution within that particular batch to an acceptable range.

In an attempt to control the size ranges of the particles and minimize or eliminate the wasteful sieving practice, or improve the uniformity of the film, droplet break-off was analyzed. In both the traditional bead spinning method and the bichromal ball spinning method, the droplet break-off at the edge of the disk is controlled by many factors. These factors include: surface tension, viscosity, the shape of the disk edge, air currents and disk rotations per minute (rpm). Small variations in any of these factors can often result in unacceptable variation in drop size. In an effort to minimize the variations, efforts are made to control the above variables. While some improvement has been seen, the waste from the process is still at undesirable levels.

INCORPORATION BY REFERENCE

The following publication, the disclosure of which being fully incorporated herein by reference is:

U.S. Pat. No. 5,262,098 Crowley, entitled "Method and Apparatus for Fabricating Bichromal Balls for a Twisting Ball Display", issued Nov. 16, 1993.

SUMMARY OF THE INVENTION

A method and apparatus for the improved formation of beads or particles. The apparatus comprises a spinning disk including a vibration inducing material. Said vibration inducing material excites the liquid material as it proceeds towards the outer perimeter of said spinning disk, controlling the droplet break-off frequency.

BRIEF DESCRIPTION OF THE DRAWINGS

The following is a brief description of the drawings which are presented for purposes of illustrating the development disclosed herein and not for the purpose of limiting the same.

DETAILED DESCRIPTION

A more complete understanding of the apparatuses disclosed herein can be obtained by reference to the accompanying drawings. These figures are merely schematic representations based on convenience and the ease of demonstrating the present development, and are, therefore, not intended to indicate relative size and dimensions of the exemplary embodiment.

Figure 1A:
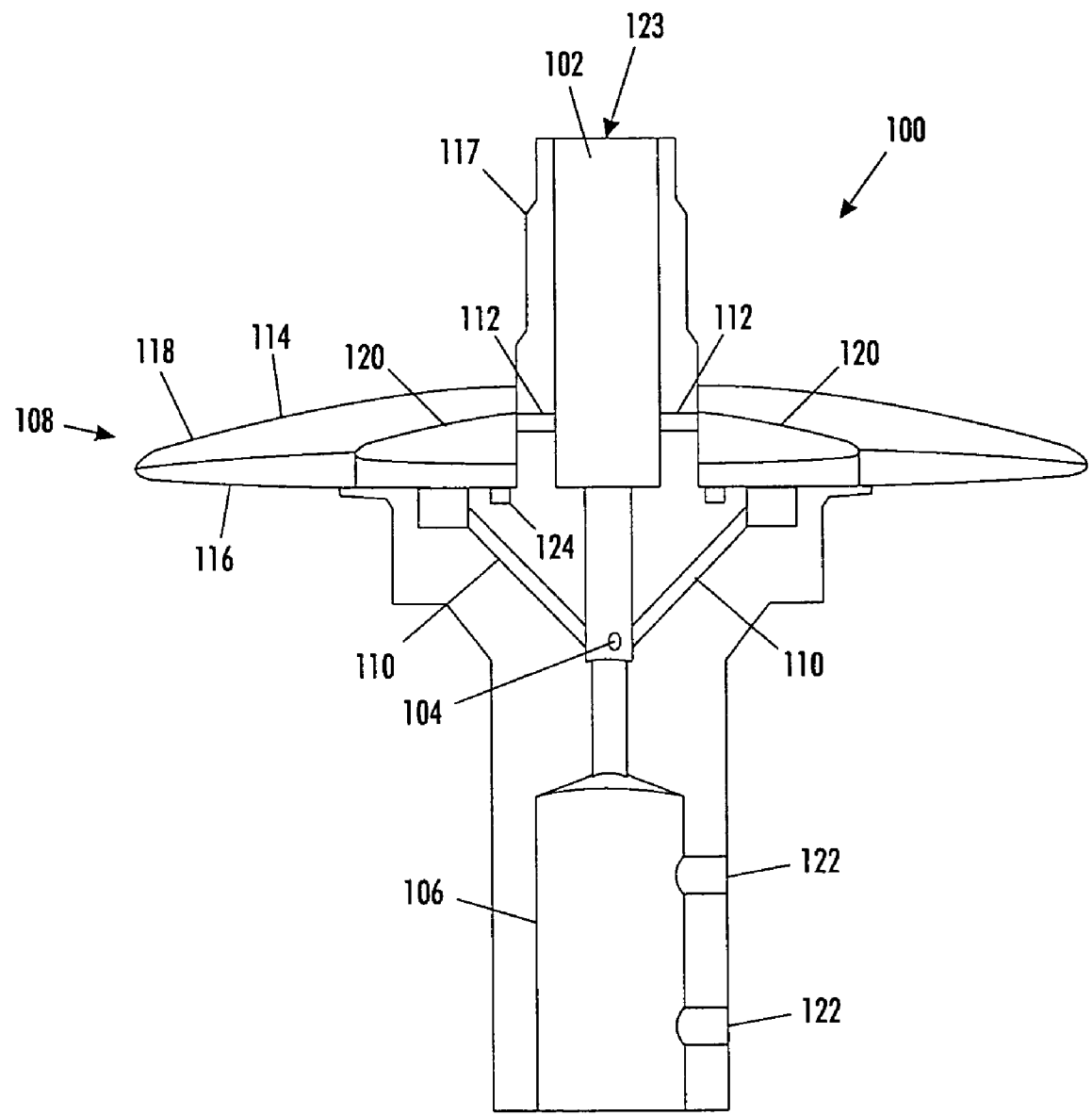
FIG. 1A is a schematic cross-section of a preferred embodiment of a spinning apparatus with a vibration inducing material embedded in the disk.
Figure 1B:
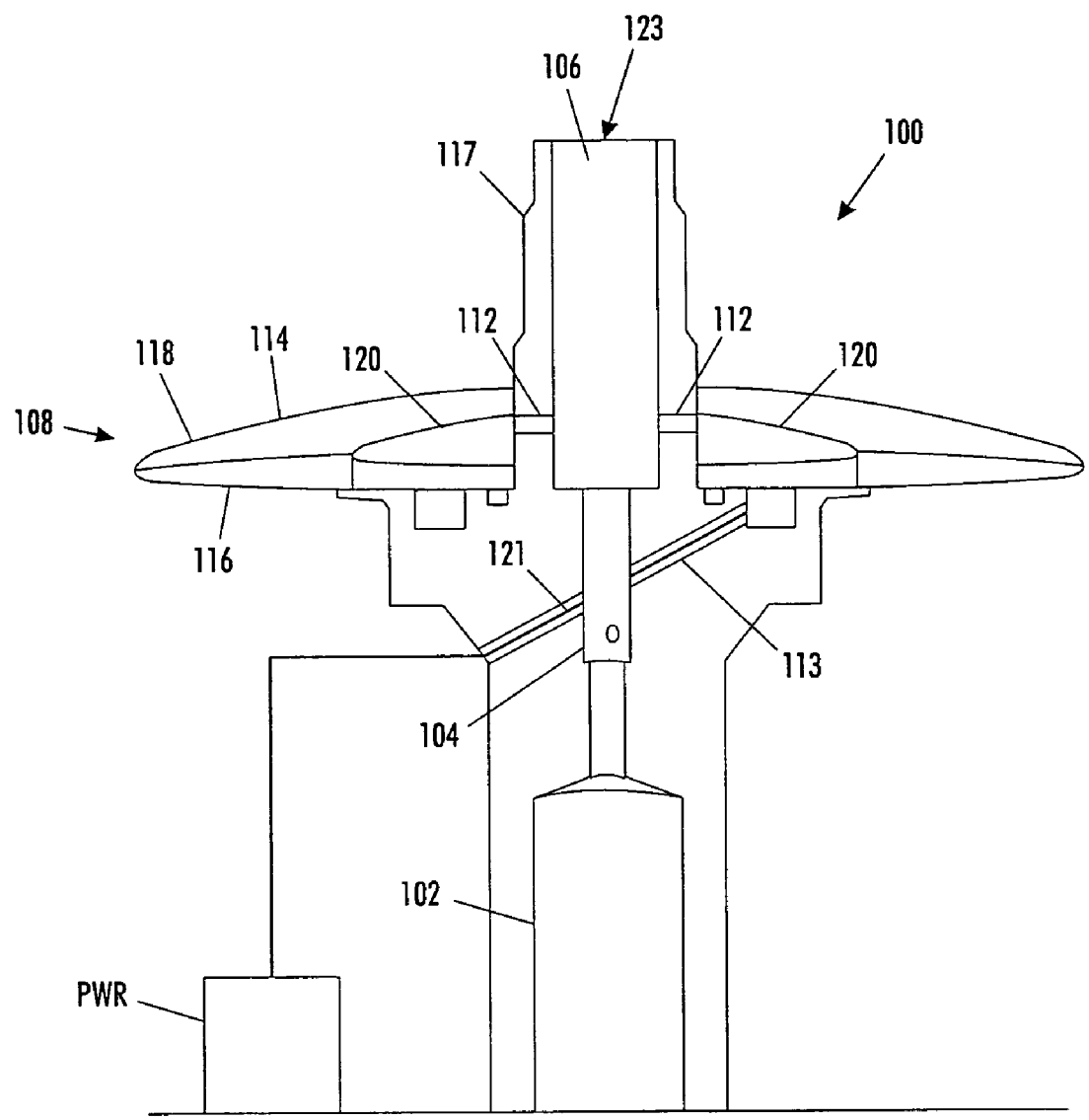
FIG. 1B is a further cross-section of the apparatus of FIG. 1A.

With reference to FIGS. 1A and 1B, a preferred embodiment of a spinning apparatus 100 is shown. Spinning apparatus 100, is configured to manufacture bichromal particles, in the form of beads or balls. Spinning apparatus 100 is primarily comprised of spinner hub portions 102, 104, and 106, a disk 108, tubular connectors 110 and 112, and electrical passages 113. The disk 108 engages the spinner hub along the upper spinner hub portion 102. Upper spinner hub portion 102 is in operative association with middle spinner hub portion 104, which in turn is in operative association with lower spinner hub portion 106. The three spinner hub portions 102, 104, and 106 can consist of one spinner hub piece or of several spinner hub pieces. The upper spinner hub portion 102 is in operative association with a first disk surface 114 through tubes 112. The middle spinner hub portion 104 is in operative association with a second disk surface 116 through tubes 110. Thus, tubes 110, 112 are positioned to permit movement of the liquid material from the tubes to the surfaces of the disk. The number of tubes used to associate either spinner hub portion to either disk surface depends on the volume of liquid material the operator wishes to use. It is also noted that various components are enclosed in an enclosure 117.

Disk 108 is configured of a first disk portion 118 made of any appropriate metal (such as stainless steel or tool steel, for example), ceramic, or other appropriate material, and a second disk portion made of a vibration inducing material 120. The vibration inducing material 120, as shown, is disposed along a central circumference of the disk 108 and can be found either as part of the first and/or second surface of the disk 108.

In one embodiment, the disk 108 and the vibration inducing material 120 are associated in such a manner as to form a "flush" surface. That is to say, an outer surface of the disk 108 with the vibration inducing material 120 attached has a smooth surface profile. The vibration inducing material 120 can be attached to the disk 108 through any appropriate attachment mechanism and/or process including glue, tape, rivets, and fasteners, among others known in the art. An alternative procedure is to manufacture the disk 108 with the vibration inducing material 120 embedded within so no fasteners are needed.

The ratio of vibration inducing material 120 to the disk 108 depends on the specific application and the preference of the user. In some embodiments, the entire disk can be constructed of the vibration inducing material 120.

Vibration inducing material 120 can be any appropriate material which experiences a deformation upon energization by application of an electrical signal. The material 120 can be a piezoelectric material, a ferroelectric material, any of the "muscle polymers" (dielectric polymers), or any magneto-restrictive material. This list is simply illustrative and is not meant to limit any materials. The primary characteristic the vibration inducing material 120 must have is the ability to change shape upon activation by a signal.

In one embodiment, the vibration inducing material 120 is a piezoelectric material. Piezoelectrics are materials that convert motion to electricity or electricity to motion. Commonly used piezoelectric materials are bulk ceramics. They may be formed by taking a powder of piezoelectric particles and compressing or sintering them under high pressure and temperature. Three particular types of piezoelectric material are: lead zirconate titanate (PZT), zinc oxide (ZnO), and polyvinylidene fluoride (PVDF) polymer films. The specific type of piezoelectric material to be used depends on the application.

Piezoelectric materials prove particularly functional in this application due to their ability to convert electricity to motion. By pulsing an electric charge to the vibration inducing material and thereby activating the material shape change, a resulting vibrating frequency is actuated throughout the disk 108. With attention to FIG. 1B, illustrated is an embodiment where electrical passages, such as passage 113, are positioned to permit electrical connection to the vibration inducing material 120. For example, electric conductor 121 passes through passage 113, connecting to the vibration inducing material 120 at a first end and to a power source PWR at a second end. Connection to the vibration inducing material 120 may be made by a number of different appropriate connections, such as but not limited to slip rings and drag contacts. Thus in this embodiment, disk 108 is motivated to spin by techniques well known in the art, and spinning hub portions 102, 104, 106, tubings 110, 112 and electrical passageways 113 are stationary. Of course, other configurations are possible, such as those which will be mentioned in connection with FIGS. 5 and 9.

Generally, in spinning applications, the liquid or molten material will commonly be a wax-like substance, a molten material, a solvent based material, a chemically cured material or a UV light cured material or other appropriate material. As such, the liquid material should not solidify until after it breaks-off the spinning disk. The temperature or solvent only need remain sufficient to maintain the liquid integrity of the liquid material. Use of PZT, includes a benefit of maintaining the material in liquid or molten form, as PZT is well suited for use in high temperature applications.

In the present embodiment, the liquid material for the second surface is provided to the system through inputs 122, and liquid material for the first surface is provided through inlet 123 of the upper spinner hub portion 102.

For ease of representation, the view of the embodiment shown in FIG. 1A illustrates only two (2) tubes 110 extending from the middle spinner hub portion 104 and two (2) tubes 112 extending from the upper spinner hub portion 102. The apparatus can have only one (1) tube per side of disk or can have several. Also depicted in FIG. 1A is an o-ring 124 which ensures the liquid materials on each surface of disk do not move onto the other disk surface, whereby undesirable mixing of the materials is avoided.

Figure 2A:
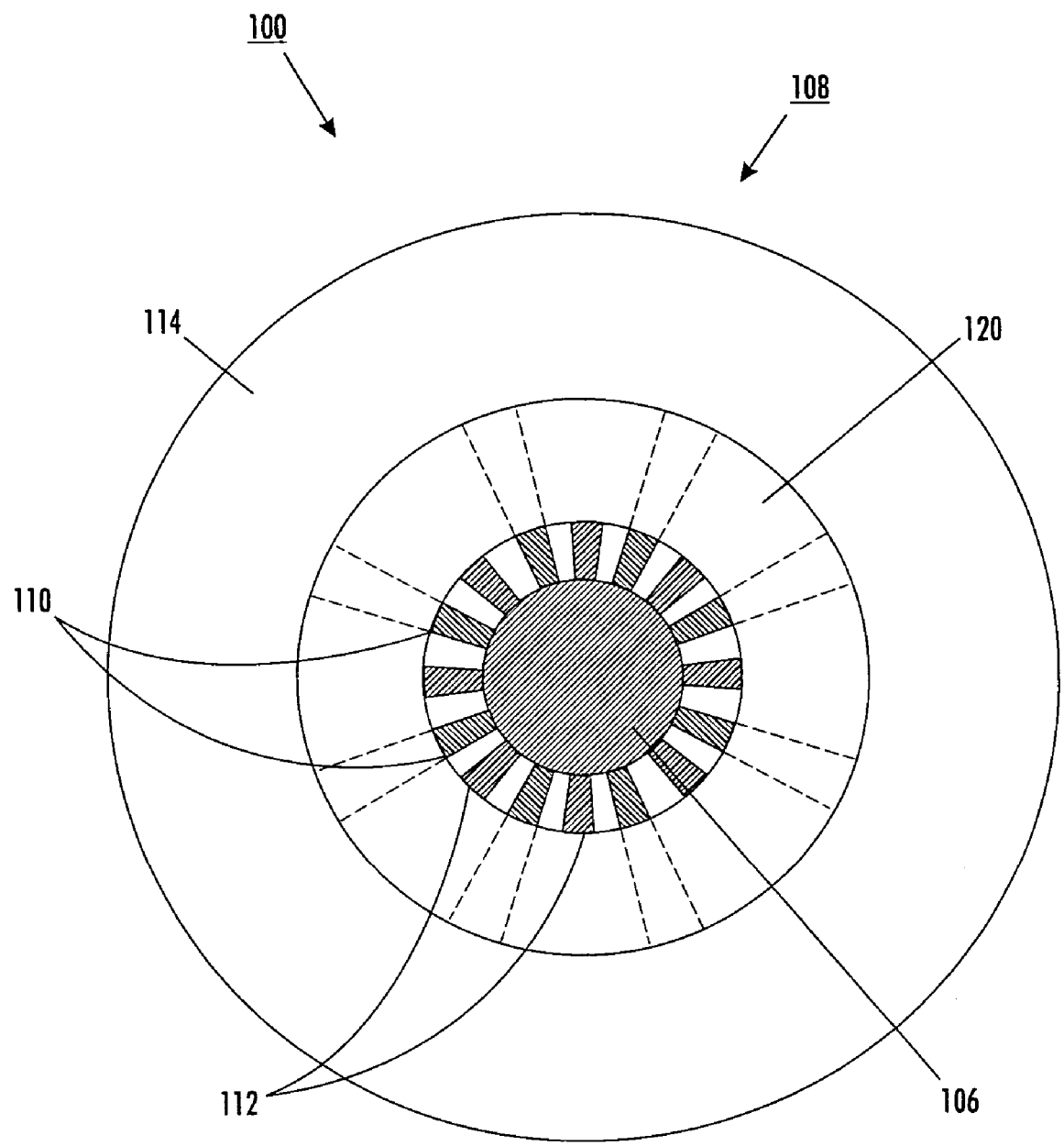
FIG. 2A is a schematic top-side view of a spinning apparatus.
Figure 2B:
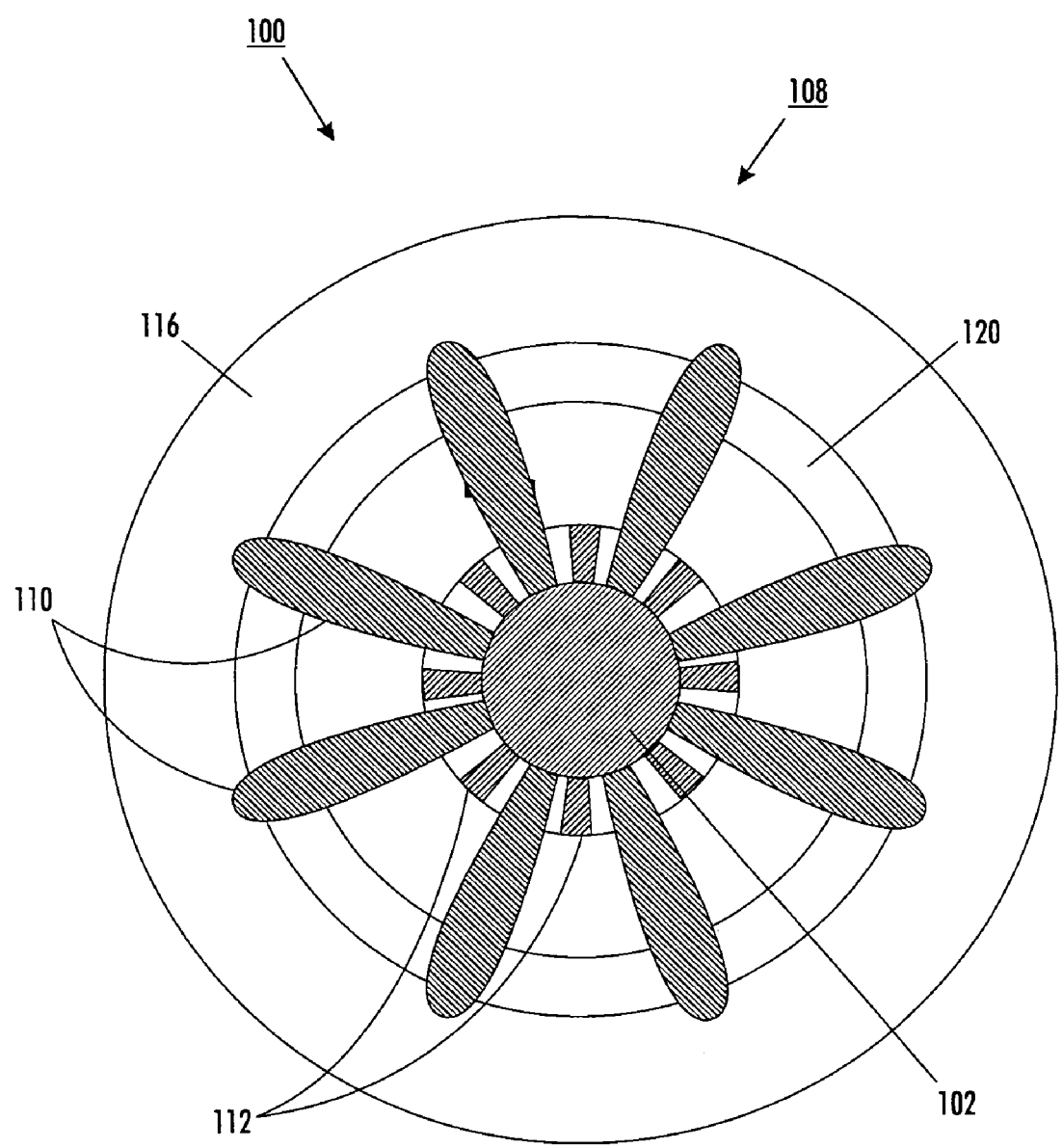
FIG. 2B is a schematic bottom-side view of FIG. 2A.

To illustrate a situation where a plurality of tubes are used, continuing attention is made to FIGS. 1A and 1B and further reference is made to FIGS. 2A and 2B where respective top and bottom views of the apparatus 100 is illustrated. Particularly, the apparatus 100 is shown having eight (8) tubes 110, which connect the middle spinner hub portion 104 to the second-side of the disk 116 and eight (8) tubes 112 connecting the upper spinner hub portion 102 to the first-side of the disk 114.

Figure 3:
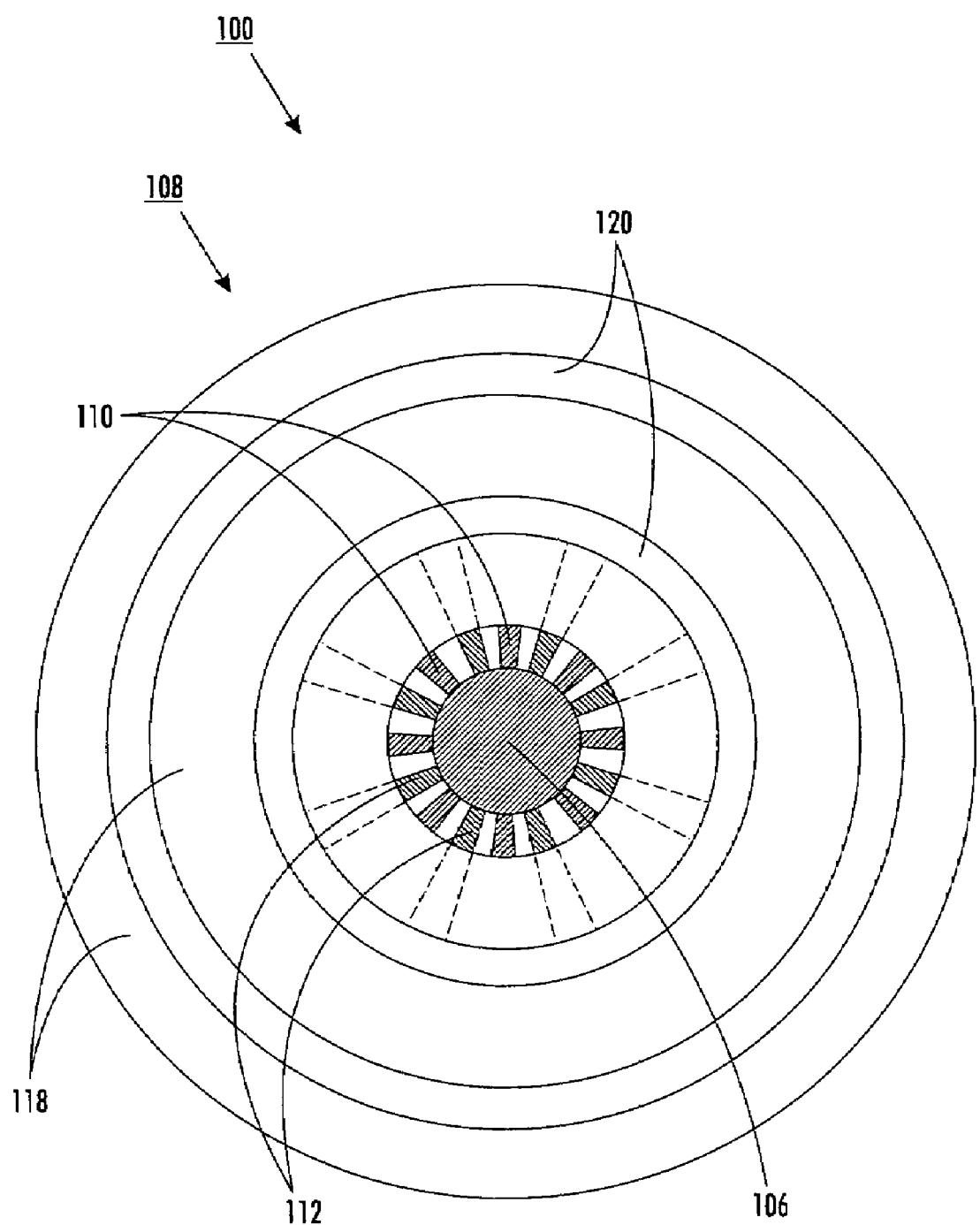
FIG. 3 is a schematic top-side view of a spinning apparatus having the vibration inducing material in concentric rings on the disk.

It is noted that FIGS. 1A and 1B illustrate the disk 108 as having one portion of the vibration inducing material 120 on each surface. It is to be appreciated in some implementations other configurations are desirable. For example, in an embodiment shown in FIG. 3, the vibration inducing material 120 is arranged to form phased rings on disk 108 to provide a wave action on the disk surface.

Figure 4:
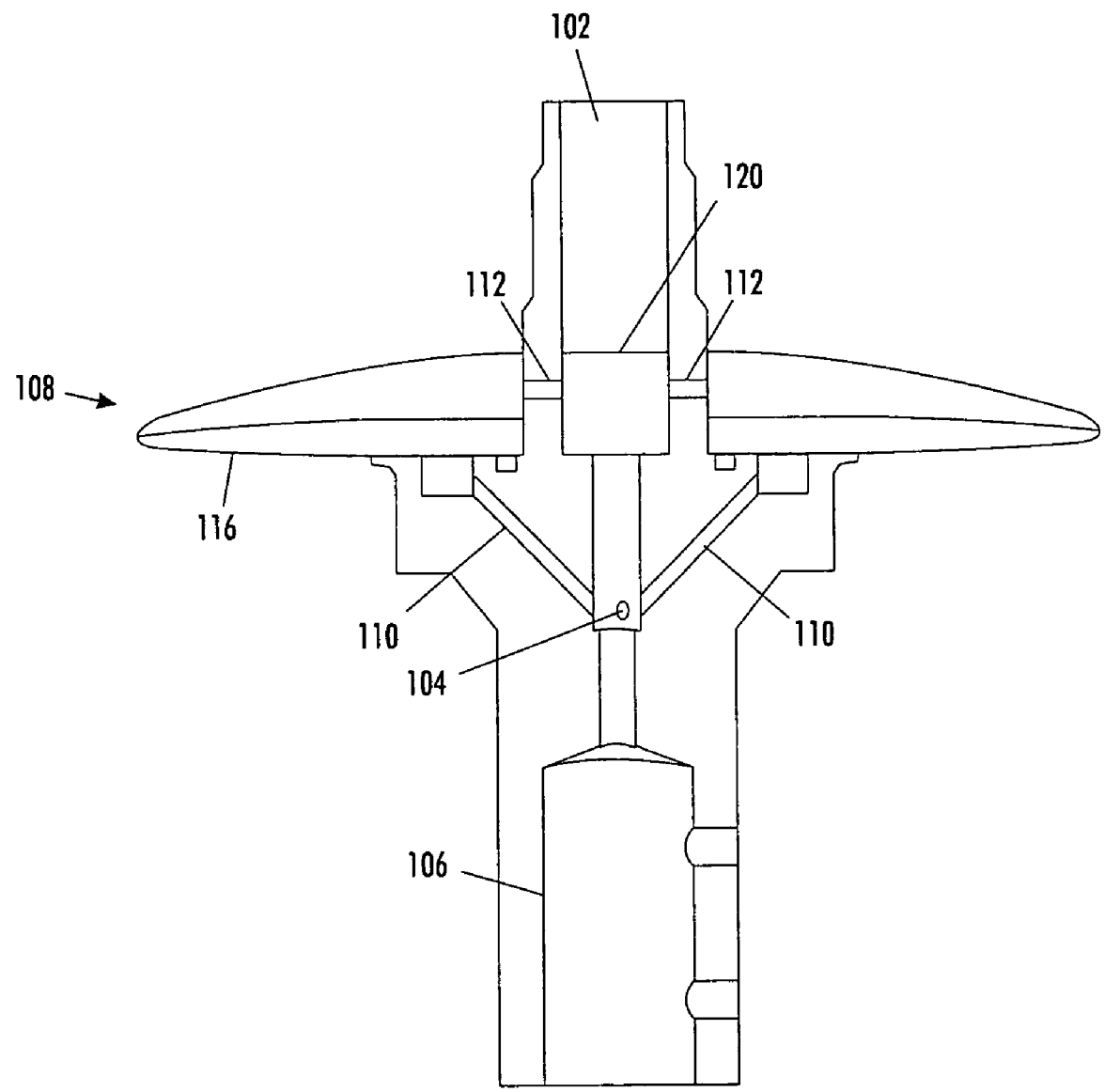
FIG. 4 is a schematic view of a spinning assembly having the vibration inducing material in the spinner hub.

Additionally, the vibration inducing material 120 need not be part of the disk. The embodiment shown in FIG. 4 illustrates spinning apparatus 100 with the spinner hub 102 including the vibration inducing material 120. In this embodiment, the vibration inducing material 120 causes the disk 108 to vibrate at a given frequency through its deformation in the spinner hub portion 102.

Figure 5:
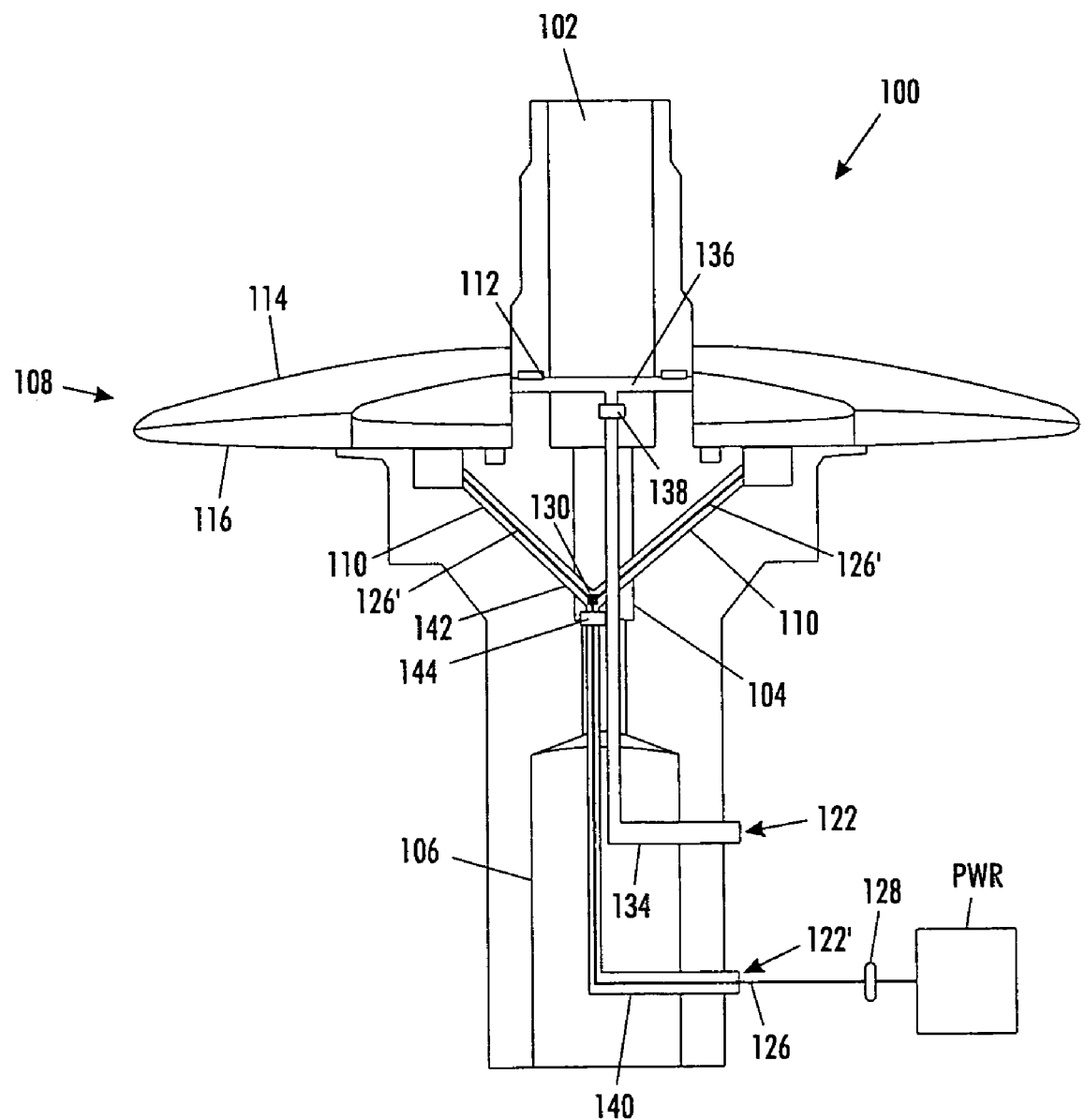
FIG. 5 is a schematic view of the internal wiring of a spinning apparatus.

FIG. 5 depicts another spinning apparatus 100' embodiment. In this configuration, the passageways which are used to move the liquid material are also used for the electrical connections, made, for example, by electrical conductors 126, 126'. More particularly, power source PWR is located external the spinning apparatus 100'. The power source PWR can take the form of an AC source or a power signal generator operating at the required frequency for proper drop break-up. The electric conductor 126 connects to T-joint 130. Once at T-joint 130, the electric conductor 126 can be separated into several conductors 126', each of which travels up any one or more of tubes 110 to the second side 116 of disk 108. Once there, the conductors 126' are placed in electrical connection with the vibration inducing material 120 by an appropriate connection technique.

FIG. 5 shows the electrical conductors 126, 126' are in the same tubing or passageways as used for the liquid material. In this embodiment, for example, the liquid material enters the lower spinner hub 106 of the spinning apparatus 100' through the liquid material inlets 122. The two types of liquid material used to form bichromal balls will be referred to as liquid material A and liquid material B for simplicity. Liquid material A enters through input 122 and travels through tubing 134, carrying material A to T-joint 136. T-joint 136 connects with tubing 134 through rotator coupling 138 which allows T-joint 136 to spin while tube 134 remains stationary. From T-joint 136, material A is dispensed to the first side 114 of disk.108 through tubes 112. Material B enters the apparatus through inlet 122 and travels through tubing 140. Tubing 140 carries material B to Y-joint 142, which connects with tubing 140 through rotator coupling 144 allowing Y-joint 142 to spin while tube 140 remains stationary. From Y-joint 142, material B is dispensed to the second side 116 of disk 108 through tubes 110.

It is noted the T-joint 136 and Y-joint 142 are referred to in this manner due to the 2-dimensional, schematic view in which they are represented. In a particular embodiment having eight (8) tubes 110 and eight (8) tubes 112, the T-joints and/or Y-joints 136, 142 may have one input and eight (8) dispensing nozzles each.

Figure 6:
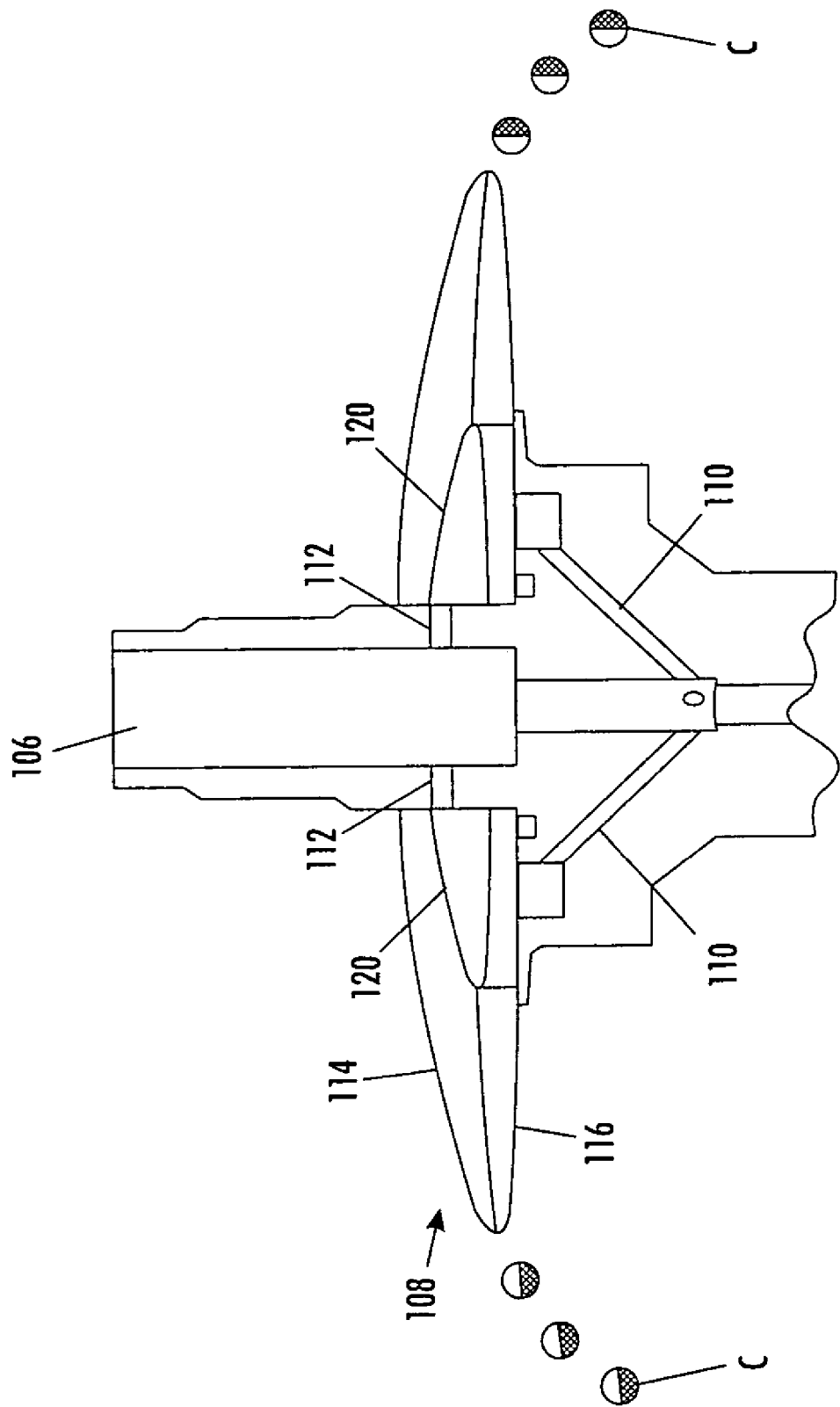
FIG. 6 is a schematic view of a spinning apparatus showing the motion of the liquid material.

With reference to FIG. 6, the formation of the bichromal particles is shown after the liquid material is dispensed onto disk 108. Once the liquid material is dispensed onto the spinning disk 108, the centrifugal force of the spinning disk 108 forces the liquid material to the outer perimeter of the disk. As liquid material A on the first side 114 of the disk 108 and liquid material B on the second side 116 of disk 108 move off to the far edge, material A and material B merge to form a combination droplet C. When the merged droplet C solidifies, materials A and B remain segregated but form together as a single particle. Giving the materials contrasting colors results in a bichromal particle with a material A colored hemisphere and a material B colored hemisphere. To assist in movement of the liquid material to an outer edge, the disk may be formed with a downward slope towards the disk edge.

This apparatus can function to form monochromal balls as well. The tooling of the apparatus would only require the tubing and functionality for the liquid material to be dispensed on one side of disk 108. The end result is a particle formed with only a single color.

As mentioned above, maintaining uniformity of finished particles is problematic with the traditional spinning methods and systems. Further, to filter nonconforming particles requires a time-consuming and wasteful sieving process. In an effort to decrease particle size variance, factors have been manipulated and the results measured. The main factors are: the viscosity of the liquid, the surface tension of the liquid, the number of rotations per minute of the disk, the air currents, and the shape of the disk edge. By setting and/or measuring the values of these factors, the average drop rate can be determined. Maintaining these factors at a constant level would desirably result in all droplets breaking-off at the natural average frequency. However, in actual implementation, small variations occur. These small variations often cause the unacceptable variation in droplet size by causing a variation in droplet break-off times. A strong correlation has been shown between the time between droplet break-off and droplet size relative to the mean size. As the variance from the mean time between droplet break-off decreases, so does the variance from the mean droplet size. Therefore, the ability to regulate droplet break-off times is important to reducing droplet size variance.

To overcome the inevitable variations of external conditions and internal non-uniformity, the present embodiments regulate droplet break-off times through use of the vibration inducing material 120. This lessens the variance of drop break-off times and therefore particle sizes. The vibration inducing material 120 excites the liquid material at a selected frequency corresponding to the desired droplet rate. The resulting frequency synchronizes the break-off of the liquids to the frequency used as long as it is reasonably close to the natural average drop rate. For example, it is believed the frequency should be within 20% of the natural average drop rate, and more preferably within 5%. The optimal frequency to be used is best found by sweeping the frequency of the vibration while measuring the particle sizes produced and thereby optimizing the frequency to produce the desired particle size. Through knowledge of the flow rate and the above factors, a reduction in the variance of the droplet break-off frequency results, leading to a reduction in the variability of the droplet size. Other methods of exciting the liquid material can also be used.

In the particular application of forming bichromal balls, the vibration inducing material 120 should generate a frequency of 5-12 kHz. However, the specific frequency to be set is application specific, and should be set to encourage droplet break-off at the mean time for drop break-off. As mentioned above, when the vibration inducing material's frequency is within a certain range of the natural average frequency of the droplets, size distribution is narrower than when the frequency is farther away or turned off.

Figure 7:
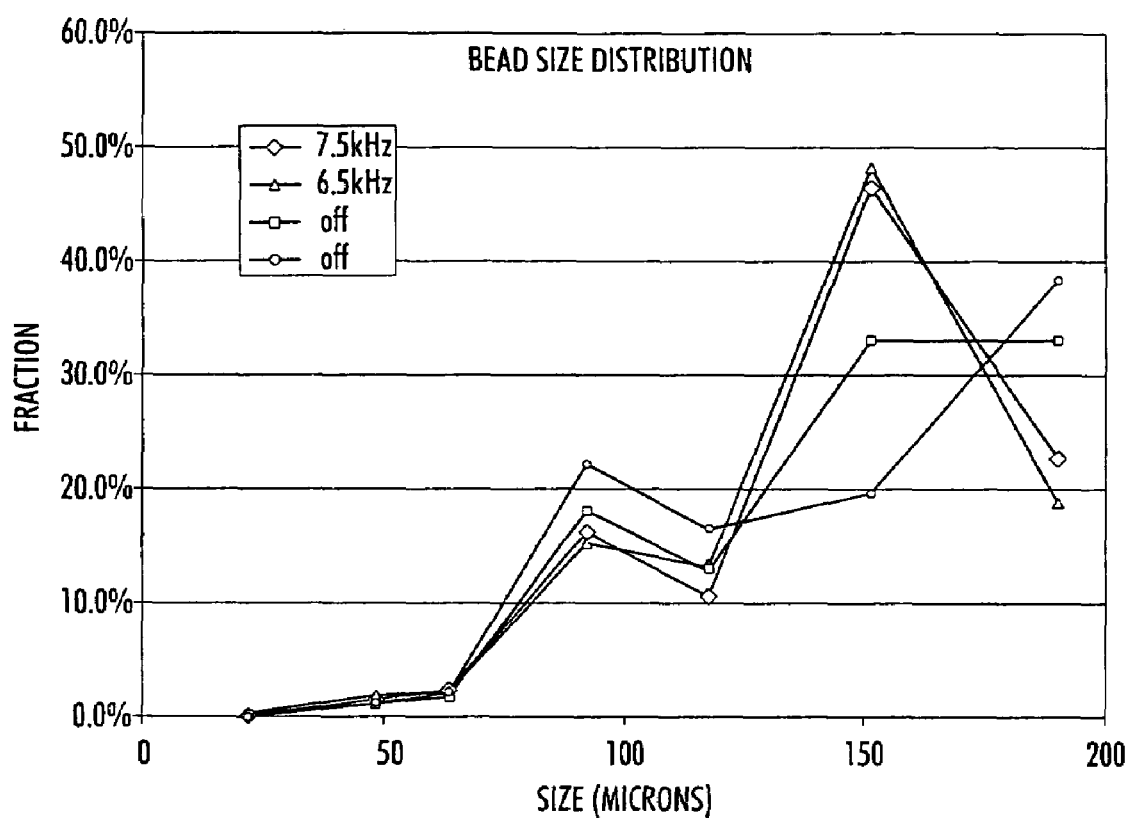
FIG. 7 is a graph plotting size variances of beads at different frequency levels.

The FIG. 7 shows the particle size distribution for particles generated at a given frequency produced by the vibration inducing material 120 for a liquid material. The graph shows frequency ranges from no vibration to 7.5 kHz and size ranges between 25 and 200 microns. The graph illustrates that when the vibration is off there is a fairly wide distribution of particle sizes from 75 to 200 microns. The graph also illustrates that at a frequencies of 6.5 kHz and 7.5 kHz, more than 45% of the particles are 150 microns—the highest level of uniformity for any of the frequencies.

Figure 8:
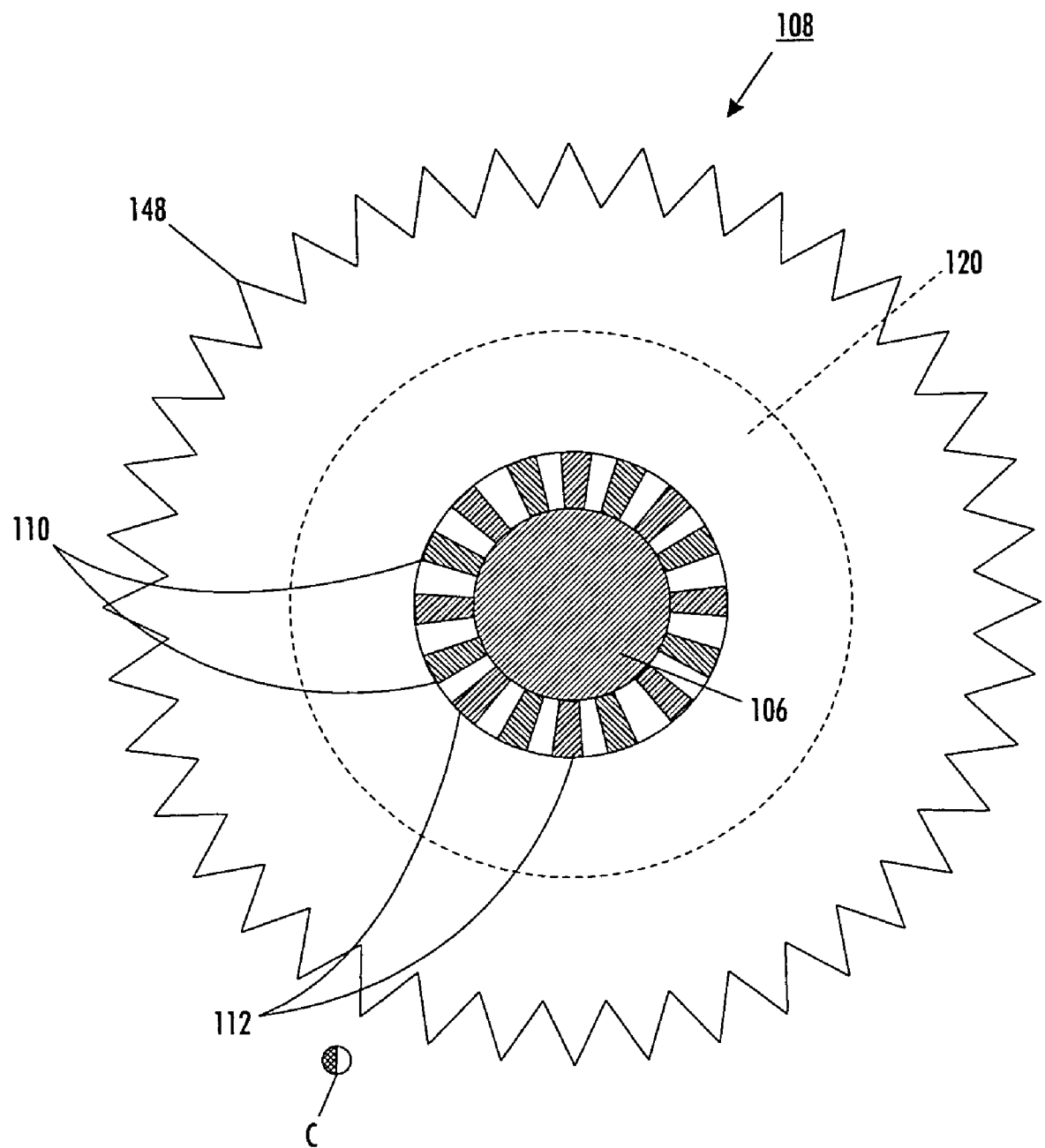
FIG. 8 is a schematic top-side view of a spinning apparatus with a serrated disk.

In FIG. 8, another embodiment is shown which uses a spinning disk 108 with serrated ends 148. The use of serrated ends 148 is intended to further lower the variability of droplet break-off. In this embodiment, droplet break-off occurs at serrated disk points 148. By controlling the position from where droplet break-off occurs, droplet size variation is better controlled. The use of a serrated disk is only one additional control which could be added to the system, the combination of serration and controlled vibration leading to an even further improved particle size control. Other controls can also be used in conjunction with the vibration inducing material 120.

Figure 9:
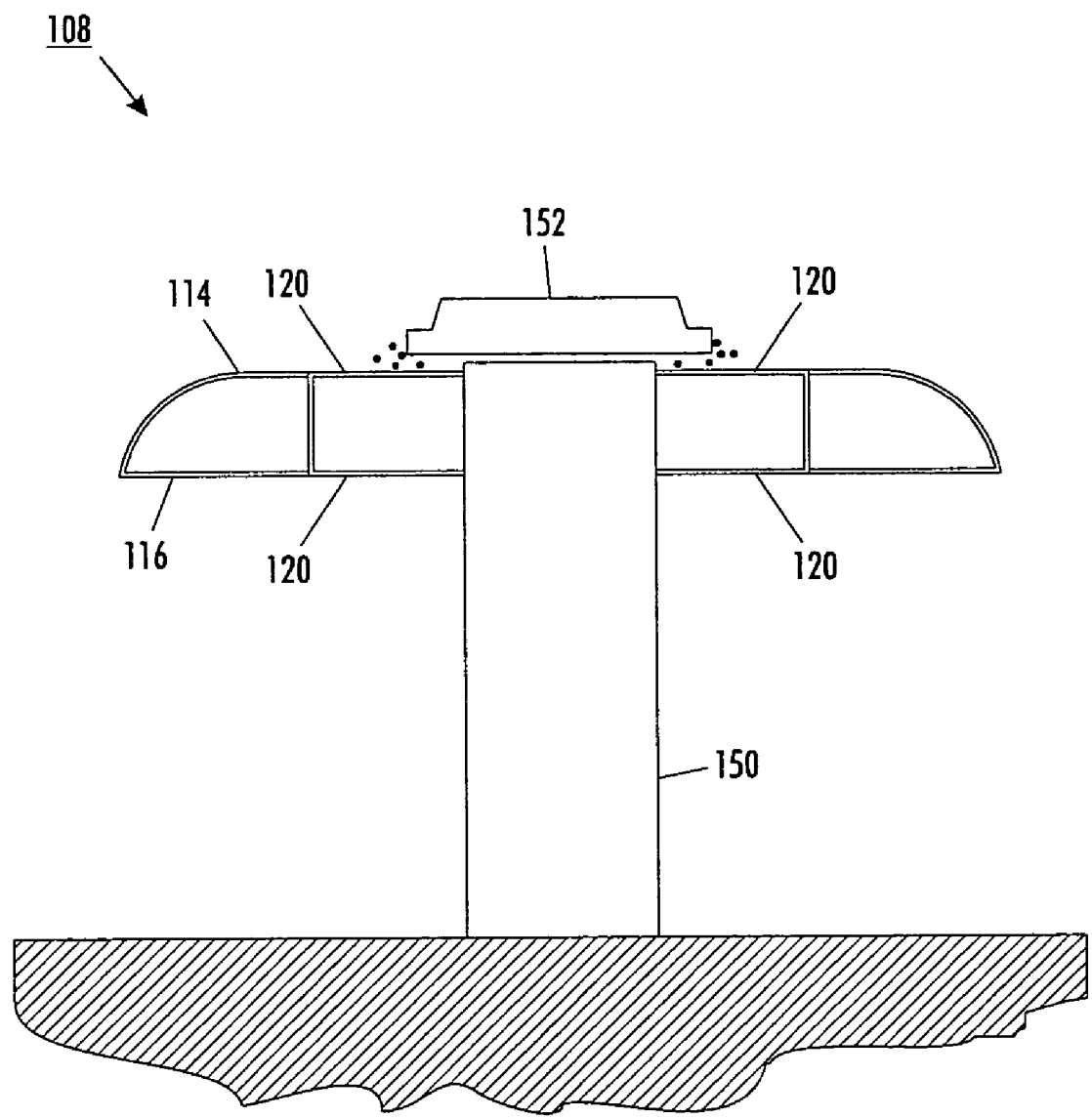
FIG. 9 is a schematic view of a spinning apparatus with a stationary spinner hub.

With reference to FIG. 9, a further embodiment of a spinning apparatus 100" is shown, having a stationary spinner hub 150, a spinning disk 108 having a first surface 114 and a second surface 116, a vibration inducing material 120 and a liquid material drip mechanism 152. In this embodiment, a stationary spinner hub 146 having a known drive arrangement forces the disk 108 to spin. While the disk 108 is spinning around spinner hub 150, liquid material is dispensed via drip mechanism 150. Drip mechanism 152 can secrete liquid material onto spinning disk 108 through a variety of different procedures. These procedures can include, but are not limited to, dripping or spraying the material onto disk 108.

FIG. 9 depicts a spinning assembly configured for the formation of monochromal particles. This is done by having the liquid material dispensed on only the first side 114 of disk 108. The embodiment of FIG. 9 can be configured to create bichromal particles by adding a liquid dispensing mechanism on the bottom of stationary spinner hub 150. Further, in both the stationary spinner hub embodiment of FIG. 9 and the embodiments of FIGS. 1-6 and 8, monochromal balls can also be produced by having the same type of liquid material dispensed onto the, bottom surface 116 of the spinning disk 108 as on the top surface 114 of the spinning disk 108. Further, the liquid material dispensing drip mechanism 152 can also be used in conjunction with the embodiments shown in FIGS. 1-6 and 8.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus for forming particles through spinning comprising:
   a disk having a first surface and a second surface;
   a spinner hub, wherein said the spinner hub rotatably engages the disk;
   a fluid path system for delivery of a liquid material to at least one surface of the disk; and
   a vibration inducing material, comprising at least a portion of at least one of the disk or the spinner hub.

2. The apparatus of claim 1, wherein the vibration inducing material is disposed along the inner circumference of the disk.

3. The apparatus of claim 2, wherein the disk and the vibration inducing material form a smooth disk surface.

4. The apparatus of claim 1, wherein the disk a serrated disk.

5. The apparatus of claim 1, wherein the disk is further comprised of-one of a metal or ceramic.

6. The apparatus of claim 1, wherein the portion of said disk not comprised of said vibration inducing material is composed of tool steel.

7. The apparatus of claim 1, wherein the disk is wholly comprised of said vibration inducing material.

8. The apparatus of claim 1, wherein the disk includes a downward slope to the disk edge.

9. The apparatus of claim 1, further defining at least one opening on the first side and at least one opening on the second side of the disk.

10. The apparatus of claim 9, wherein the first side opening and the second side opening are adapted for the receipt of liquid material.

11. The apparatus of claim 9, wherein at least one of the first side opening and the second side opening are adapted to allow an electrical conductor to pass to and connect with vibration inducing material.

12. The apparatus of claim 1, wherein the vibration inducing material is capable of changing shape upon electric activation.

13. The apparatus of claim 12, wherein the vibration inducing material is a piezoelectric material.

14. The apparatus of claim 12, wherein the vibration inducing material is a ferroelectric material.

15. The apparatus of claim 1, wherein the spinner hub is adapted to receive said liquid material.

16. The apparatus of claim 15, wherein the spinner hub is adapted to contain liquid material and electric conductors.

17. The apparatus of claim 1, wherein the disk further defines a plurality of opening and the spinner hub defines a plurality of openings, each of the disk openings having an associated spinner hub opening with which the pair are in fluid communication with one another through a tube connecting the disk opening to the associated spinner hub opening.

18. The apparatus of claim 17, wherein at least one disk opening is on the first side of the disk and at least one disk opening is on the second side of the disk.

19. The apparatus of claim 18, wherein the spinner hub is adapted to supply associated liquid material from one source to the first side of the disk and associated liquid material from a different source to the second side of the disk.

20. A method for forming particles comprising:
   releasing a liquid material from a central spinner hub onto a first side of a disk and a second side of the disk;
   vibrating the disk through a vibration inducing material; and
   spinning the disk to force the liquid material to the edge of the disk, wherein the liquid material on the first side and the liquid material on the second side drop off of the disk and join together to form droplets consisting of first side liquid material and second side liquid material.

21. The method of claim 20, wherein the vibrating takes place at a frequency of 2-12 kHz.

22. The method of claim 21, wherein the vibrating is caused by the changing of shape of a material caused by the introduction of an electric voltage.

23. The method of claim 20, wherein the disk and said vibration inducing material are at a temperature sufficient to maintain wax in a liquid state.

* * * * *